J. LANGE.
SEEDER.
APPLICATION FILED AUG. 26, 1918.

1,298,738.

Patented Apr. 1, 1919.

Witnesses
W. C. Fielding
W. H. Mulligan

Inventor
John Lange
By Richard B. Owen
Attorney

UNITED STATES PATENT OFFICE.

JOHN LANGE, OF CHIPPEWA FALLS, WISCONSIN.

SEEDER.

1,298,738.  Specification of Letters Patent.  Patented Apr. 1, 1919.

Application filed August 26, 1918. Serial No. 251,499.

*To all whom it may concern:*

Be it known that I, JOHN LANGE, a citizen of the United States, residing at Chippewa Falls, in the county of Chippewa and State of Wisconsin, have invented certain new and useful Improvements in Seeders, of which the following is a specification.

This invention relates to planting machinery and more particularly to an attachment for a seeder or grain sowing machine.

The primary object of the invention is to provide a box attachment for the ordinary grain seeder and adapted to receive a quantity of the seed to be planted for the purpose of being intermittently ejected from the box by suitable mechanism mounted to be actuated at regular intervals by the spokes of the wheel of the seeder.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 3:
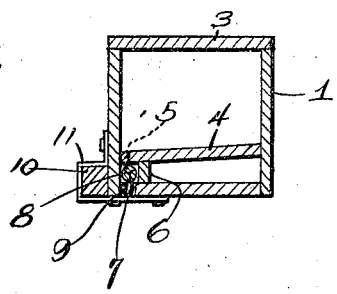
Fig. 3 is a section taken on the line 3—3 of Fig. 1.

Referring to the drawings, wherein is illustrated the preferred form of my invention, in which like numerals of reference indicate like or corresponding parts throughout the several views, the seed box 1 is of elongated formation and is adapted to contain a quantity of seeds. This box is suspended by hangers 2 from any convenient point on the binder preferably at the front of the seeder box on the binder. A hinged cover 3 is provided to close the box, which as shown in Fig. 3 is constructed to contain a quantity of seeds before it need be replenished. In the bottom of the seed box is a false bottom 4 which is spaced above the real bottom of the box and is inclined forwardly as shown.

Figure 1:
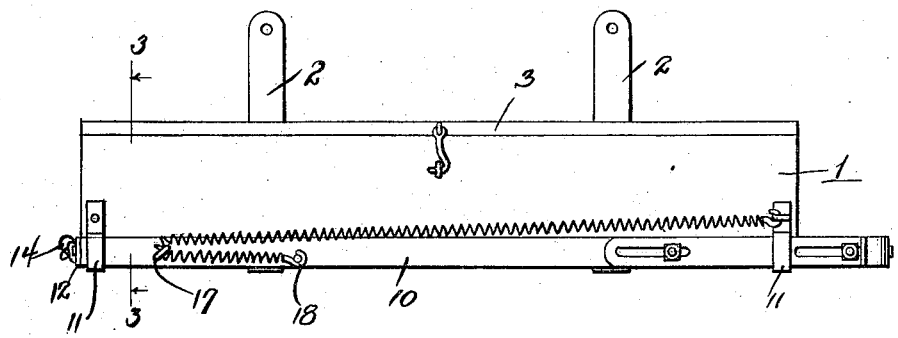
Figure 1 is an elevation of the device constructed in accordance with my invention.
Figure 2:
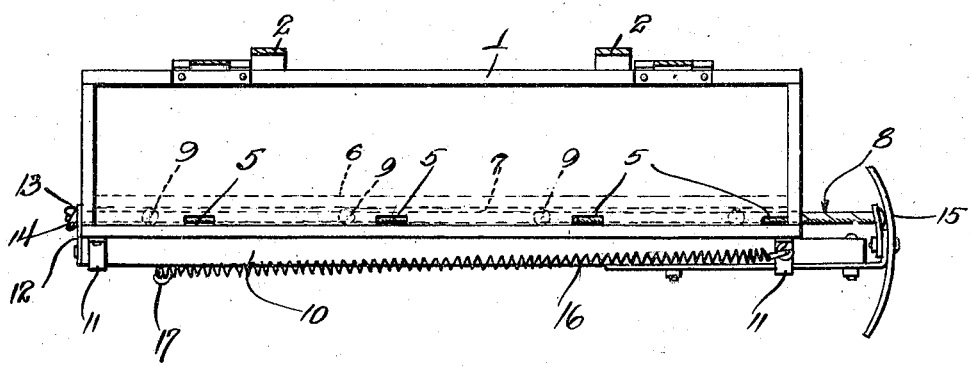
Fig. 2 is a plan view of the same showing the cover removed.

The forward end of this bottom is provided with a plurality of longitudinally spaced slots 5 through which the seed is permitted to pass. Interposed between the bottom wall and the false bottom 4 and arranged near the front wall of the box is a dividing wall 6 which thereby forms a longitudinal space 7 beneath the false bottom and near the front of the box and into which the seeds are deposited when they pass through the slot 5. Longitudinally extended through this space is a cable 8 which as shown in cross section in Fig. 3, almost entirely fills the space, there being just sufficient room around the cable to permit the reception of a few seeds which pass through the slots 5. The cables, being of ordinary construction such as rope, will receive and carry the seeds whenever the cable is moved through the space. The bottom of the box is provided with outlet openings 9 which as shown to advantage in Fig. 2 of the drawings, are arranged in longitudinal alinement with the slot 5 and are somewhat spaced from it so that when the seeds are deposited on the cable through the slot 5, and the cable is moved longitudinally, the seeds will be carried toward the openings 9 and deposited through the bottom of the box.

Mounted for longitudinal reciprocatory movement on the box is a bar 10 held by brackets 11 and provided at one end with a stop plate 12 which has a portion overlapping the end of the box as indicated at 13. The end of the cable extends through the end wall of the box and is fixed as at 14 to this overlapped portion of the plate so that when the bar is reciprocated, the cable will also be moved in the space 7. The opposite end of the bar is extended considerably beyond the end of the box and has attached thereto an arcuate arm 15 which is adapted to be engaged by the spokes of the wheel of the planter, the device being mounted in any convenient manner in order that this element 15 may be within the path of the spokes of the wheel as the latter is rotated.

As each spoke engages the member 15, the bar 10 is thrust inwardly and the plate 12 will pull the cable through the space 7 and cause the seeds to be carried from the slot 5 to the openings 9. A coil spring 16 is fixed to one of the brackets 11 and has its opposite end passed around a hook 17 and its terminal fixed as at 18 so that the bar will be immediately brought back to normal position after being engaged by one of the spokes so that it is always reciprocating when the wheel is rotating. This causes a constant reciprocation of the cable through the space 7 and consequently the seeds are continually being carried from the slot 5 to the openings 9 to be deposited through the bottom of the box.

The foregoing description and accompanying drawings have reference to what might be considered to be the preferred or approved form of my invention. I desire it to be understood that I may make such changes in the construction, combination and arrangement of parts, materials, dimensions, et cetera as may prove expedient and fall within the scope of the appended claims.

Having thus fully described my invention what I claim as new and desire to secure by Letters Patent, is:—

1. A seeder comprising a box, the said box having a false bottom inclined toward the front of the box, the forward edge of the inclined bottom being provided with a longitudinally spaced slot, the space between the false bottom and the actual bottom of the said box being provided with a partition arranged near the front wall of the box to form a relatively narrow space beneath the said false bottom, the said actual bottom of the box being provided with openings communicating with the said space and longitudinally spaced from the said slot in the false bottom, a cable mounted in the said space and means to actuate the said cable in the said space, to carry the material received through the said slot to the said openings.

2. A seeding device comprising a box having a false bottom therein, the said bottom being provided with a slot, the actual bottom of the box being provided with openings longitudinally spaced from the said slot, and means mounted beneath the said false bottom and in proximity to the said slot and the said openings to carry the contents of the box received through the slot to the said openings for being deposited through the bottom of the box.

3. A a seeder comprising a box having a false bottom mounted therein and inclined toward the front of the box, outlet openings provided in the bottom of the box, the said box having an actuating bar longitudinally slidable and provided at one end with an arm for actuating the said bar, a cable fixed to one end of the bar and passing above the said openings beneath the false bottom, and a coil spring to normally urge the said bar to normal position against the action of the said means for actuating the bar.

4. A seeder comprising a box having a restricted space provided in its bottom, a cable passing through the said space, means to permit a quantity of the contents of the box to pass into the said space and be received on the said cable, and means to actuate the said cable for carrying the material received in the space to another point within the said space.

5. A seeder comprising a box having a restricted space provided in its bottom, a cable passing through the said space, means to permit a quantity of the contents of the box to pass into the said space and be received on the said cable, and means to actuate the said cable for carrying the material received in the space to another point within the said space, the bottom of the said box being provided with outlet openings to receive the said material after being removed by the cable and means to move the cable back to normal position.

In testimony whereof I affix my signature in presence of two witnesses.

JOHN LANGE.

Witnesses:
J. G. PRUEHER,
HAZEL BENSON.

Copies of this patent may be obtained for five cents each, by addressing the "Commissioner of Patents, Washington, D. C."